May 27, 1952  E. HRABAL  2,598,261
WHEELBARROW WITH SHIFTABLE LOAD SUPPORTING HANDLES
Filed April 14, 1948
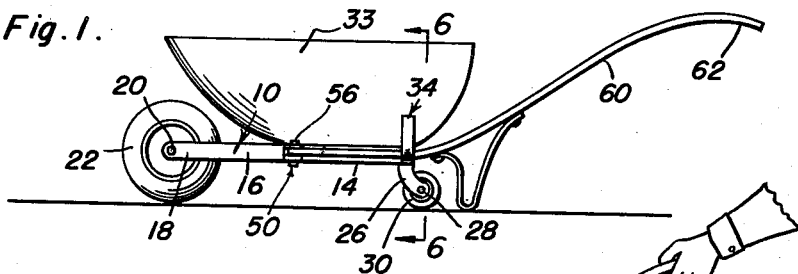
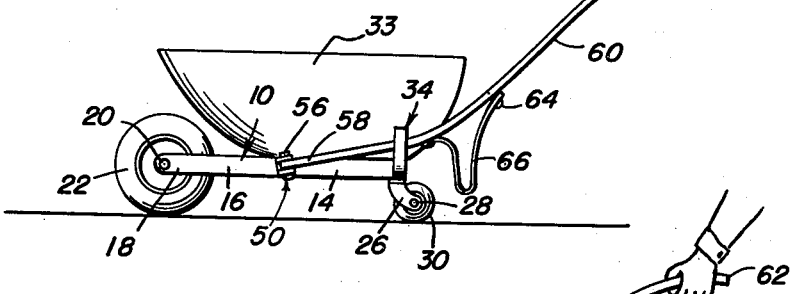
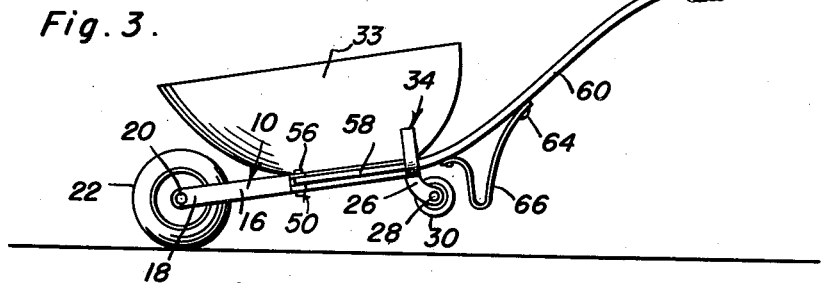
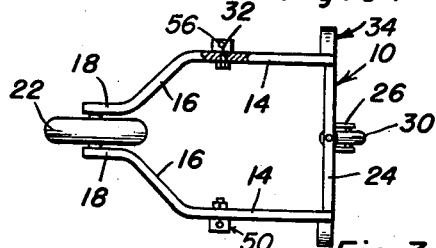
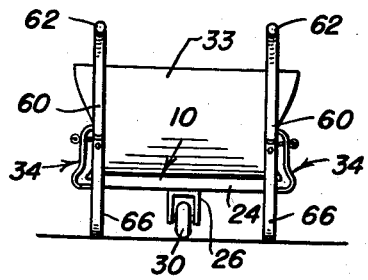
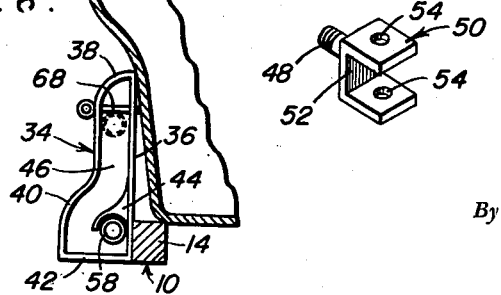
Inventor
Eduard Hrabal
By Clarence A. O'Brien
and Harvey B. Jackson
Attorneys Patented May 27, 1952

2,598,261

UNITED STATES PATENT OFFICE 2,598,261

WHEELBARROW WITH SHIFTABLE LOAD SUPPORTING HANDLES

Eduard Hrabal, Washington, D. C., assignor of thirty-five per cent to Rafael Dominguez, Washington, D. C.

Application April 14, 1948, Serial No. 20,957

1 Claim. (Cl. 280—55)

This invention relates to a wheelbarrow and has for its primary object to relieve the user of the strain encountered in using an ordinary wheelbarrow and, at the same time, permit the wheelbarrow to be used in the conventional manner.

Another object is to support the load wholly independently of the handles of the wheelbarrow during the transportation of a load thereon and, at the same time, permit of the balancing of the wheelbarrow, and the sustaining of a portion of the load on legs when the wheelbarrow is at rest.

The above and other objects may be attained by employing this invention which embodies among its features a frame, a wheel supporting the forward end of the frame, an auxiliary wheel carried by the frame behind the first mentioned wheel for supporting the rear end of the frame, a receptacle mounted on the frame, a handle connected to each side of the frame intermediate its ends for universal movement, a leg carried by each handle adjacent the rear end of the frame, and means on each side of the frame for holding the handle on its respective side of the frame in a lowered position and a leg carried by the handle in load sustaining position.

Other features include a guide fixed on each side of the frame and receiving an adjacent handle, and stops carried by the guides for engaging the handles and holding the legs in load sustaining position.

In the drawings:

Figure 1 is a side view of a wheelbarrow embodying the features of this invention illustrating the handles in lowered position, with the legs in load sustaining position, Figure 2 is a side view of the wheelbarrow illustrating the handles elevated and the load sustained on the supporting wheels and being balanced by the user, Figure 3 is a side view of the wheelbarrow illustrating it used in the conventional manner, Figure 4 is a rear end view of the wheelbarrow when in the position illustrated in Figure 1, Figure 5 is a plan view of the wheelbarrow frame, Figure 6 is a fragmentary enlarged sectional view taken substantially along the line 6—6 of Figure 1, and Figure 7 is a perspective view of one of the universal couplings by which the handles are connected to the frame of the wheelbarrow.

Referring to the drawings in detail, a wheelbarrow frame designated generally 10 comprises a pair of side bars 14 provided at their forward ends with converging extensions 16 which terminate in spaced parallel extensions 18 through which is projected a conventional spindle 20 upon which a conventional wheelbarrow supporting wheel 22 is mounted to rotate. The ends of the side bars 14 remote from the convergent extensions 16 are joined by a cross-bar 24, and swivelly mounted intermediate the ends of the cross-bar 24 and directly to the rear of the wheel 22 is a forked yoke 26 carrying between the arms thereof a spindle 28 on which an auxiliary supporting wheel 30 is mounted to rotate. Extending through the side bars 14 near their junction with the convergent extensions 16 are aligned openings 32 for a purpose to be more fully hereinafter described. A suitable receptacle of any conventional form 33 is mounted on the frame for receiving the load to be handled by the wheelbarrow.

Fixed to each side bar 14 adjacent its junction with the cross-bar 24, and extending upwardly from the plane of the upper edges of the side bars 14 is a guide designated generally 34. Each such guide comprises a standard 36 to the upper end of which is connected one end of a guide wall 38 which extends outwardly and downwardly as illustrated in Figure 6 and is provided with an outwardly offset portion 40 which is joined to one end of a bottom strip 42, the opposite end of which joins the standard 36. Formed on the standard 36 adjacent its lower end and projecting in the direction of the offset portion 40 is a hook 44, which cooperates with the outer member 38 in forming a guide passage 46 for an adjacent handle as will be more fully hereinafter explained.

Mounted in each opening 32 for rotation therein is the stem 48 of a handle connecting yoke designated generally 50. This yoke comprises a substantially U-shaped body 52, the bight portion of which is fixed to its respective stud 48, and formed in the legs of the U-shaped body 52 are aligned openings 54 for the reception of a pivot pin 56 by means of which a handle 58 is pivotally coupled at one end to the yoke 50. Each handle 58 curves upwardly as at 60 and terminates at its upper end in a grip 62 which is adapted to be grasped by the hands of the user of the wheelbarrow. Coupled as by rivets 64 to each handle 58 immediately to the rear of the frame 10 is a leg 66, which projects downwardly, and when the handle is in lowered position engages the surface upon which the wheelbarrow is supported, as will be readily understood upon reference to Figures 1 and 4.

When the wheelbarrow is at rest and it is desired to balance it in load sustaining position, the handles 58 are lowered as illustrated in Figures 1, 3 and 6, and engage beneath the hooks 44. It will thus be seen that when the wheelbarrow is at rest, the legs 66 will be in contact with the surface upon which the wheelbarrow is supported, and will effectively balance it against tilting sidewise and discharging the load therefrom. Likewise, with the handles 58 in this position, the wheelbarrow may be tilted upwardly as illustrated in Figure 3 and handled in the conventional manner. When it is desired to relieve the user from supporting the weight of the wheelbarrow and the load therein, the handles 58 are disengaged from beneath the hooks 44 and allowed to move upwardly through the channels 46 to engage suitable stop pins 68 which extend through the standards 36 and the guard members 38 adjacent their upper ends. In this way, the grips 62 will be elevated into a convenient position for controlling the movements of the wheelbarrow and the weight of the wheelbarrow and the load contained within the receptacle 33 will be supported on the wheels 22 and 30, with the user only exerting the effort required to preserve the balance of the wheelbarrow. Since the yoke 26 of the wheel 30 is swivelly mounted on the cross-bar 24, it will be obvious that the wheel 30 will function as a caster wheel to facilitate the steering of the wheelbarrow.

While in the foregoing there has been shown and described the preferred embodiment of this invention it is to be understood that minor changes in the details of construction, combination and arrangement of parts may be resorted to without departing from the spirit and scope of the invention as claimed.

Having described the invention what is claimed as new is:

A wheelbarrow comprising a frame, a wheel supporting the forward end of the frame, an auxiliary wheel carried by the frame behind the first-mentioned wheel for supporting the rear end of the frame, a receptacle mounted on the frame, a handle on each side of the frame, a universal coupling at one end of each handle, each coupling connecting its respective handle to said frame intermediate the ends thereof, a leg carried by each handle intermediate its ends, a standard on each side of said frame adjacent the rear end thereof, and a stop on the upper and lower portions on each standard vertically spaced from each other for engaging an intermediate portion of each associated handle whereby to hold said handle in vertically adjusted position with respect to said frame and selectively supporting the rear end of the wheelbarrow on the auxiliary wheel or on the legs, each said handle being movable outwardly and upwardly about said universal coupling whereby to disengage each stop on the lower portion of the adjacent standard.

EDUARD HRABAL.

REFERENCES CITED

The following references are of record in the file of this patent:

UNITED STATES PATENTS

| Number | Name | Date |
| --- | --- | --- |
| 772,253 | Ray | Oct. 11, 1904 |
| 931,096 | Todd | Aug. 17, 1909 |
| 1,255,128 | Bayley | Feb. 5, 1918 |
| 2,394,245 | Koller | Feb. 5, 1946 |